United States Patent
Gustafsson et al.

(10) Patent No.: US 6,385,968 B1
(45) Date of Patent: May 14, 2002

(54) EXHAUST DISCHARGE SYSTEM WITH LOW IR SIGNATURE

(75) Inventors: Tore Gustafsson; Alfons Falk, both of Bonassund; Orjan Olsson, Ornskoldsvik, all of (SE)

(73) Assignee: Hagglunds Vehicle AB, Ornskoldsvik (SE)

(*) Notice: Subject to any disclaimer, the term of this patent is extended or adjusted under 35 U.S.C. 154(b) by 0 days.

(21) Appl. No.: 09/722,280

(22) Filed: Nov. 28, 2000

(51) Int. Cl.$^7$ ................................................ F01N 3/02
(52) U.S. Cl. ........................ 60/320; 60/307; 60/317; 123/41.09; 123/41.11; 123/41.49; 180/68.4; 180/68.1; 180/68.6; 181/259; 181/262
(58) Field of Search ..................... 60/320, 307, 308, 60/315, 316, 317; 123/41.09, 41.49, 198 E, 41.11; 180/68.1, 68.2, 68.3, 68.4, 68.6, 69.2, 296; 181/259, 260, 261, 262, 263, 200, 202, 204

(56) References Cited

U.S. PATENT DOCUMENTS

| | | | | |
|---|---|---|---|---|
| 3,856,439 A | * | 12/1974 | Moehrbach | .................. 417/312 |
| 3,982,600 A | * | 9/1976 | Gerresheim et al. | ...... 180/69 C |
| 4,241,702 A | * | 12/1980 | Takeuchi et al. | ............ 123/41.7 |
| 4,844,701 A | * | 7/1989 | Wolford et al. | .............. 417/234 |
| 5,036,931 A | * | 8/1991 | Iritani | ........................ 180/68.1 |
| 5,269,264 A | * | 12/1993 | Weinhold | ................. 123/41.05 |
| 5,816,351 A | * | 10/1998 | Akira et al. | ................ 180/68.1 |
| 6,192,839 B1 | * | 2/2001 | Takeshita et al. | ......... 123/41.49 |

\* cited by examiner

*Primary Examiner*—Thomas Denion
*Assistant Examiner*—Binh Tran
(74) *Attorney, Agent, or Firm*—Young & Thompson

(57) ABSTRACT

The invention concerns an arrangement for a discharge system for combustion gases from a motor-driven vehicle which gives the vehicle a low IR signature. According to the invention, the gas outflow channel (28), at least in an area of the channel adjacent to the discharge aperture (32), has a boundary wall (34) which is perforated right up to the open discharge aperture (32) and surrounded by a cooling air channel (38). The arrangement is such that cooling air can sweep over the inner side as well as the outer side of the perforated wall (34).

2 Claims, 1 Drawing Sheet

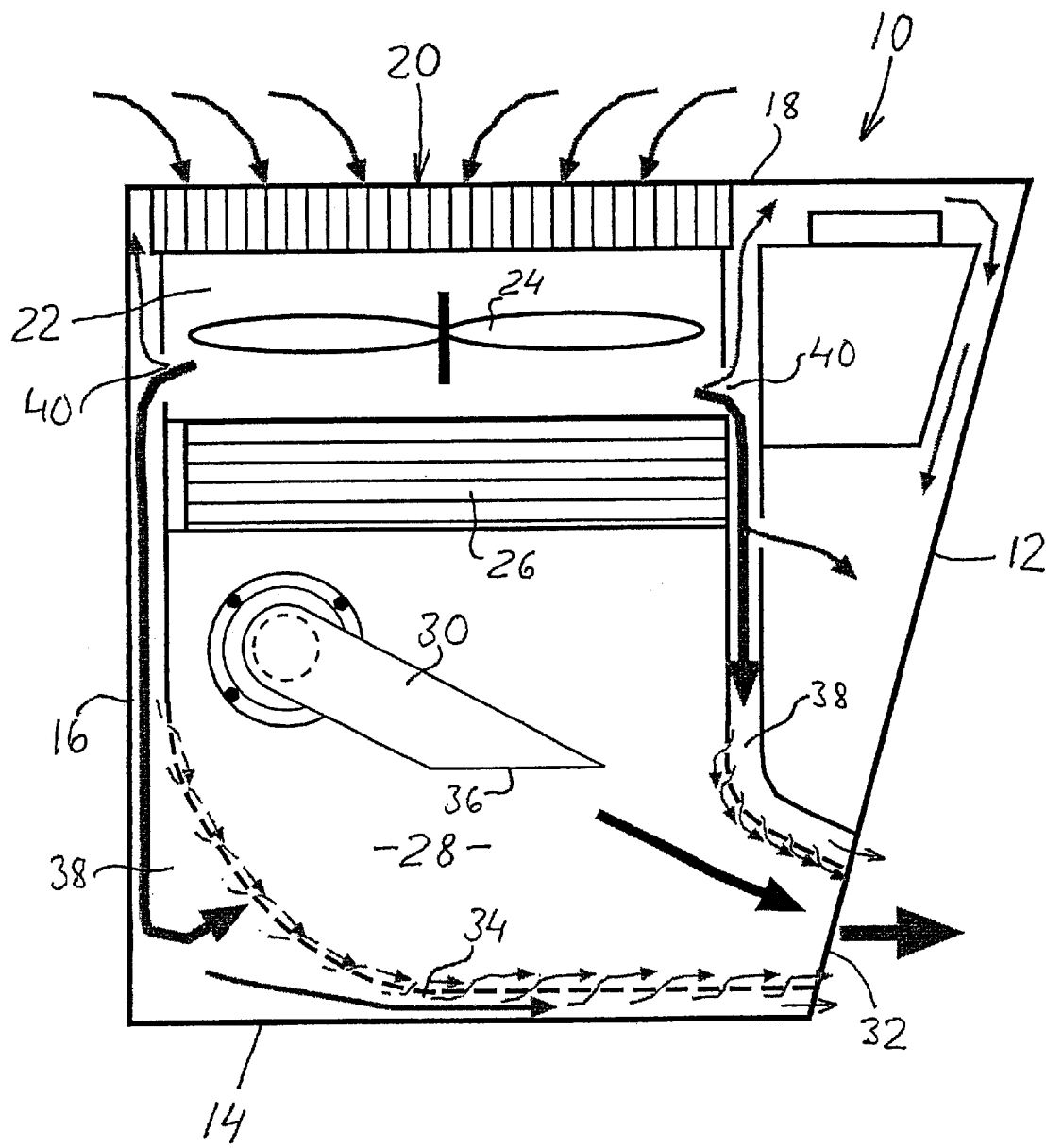

EXHAUST DISCHARGE SYSTEM WITH LOW IR SIGNATURE

BACKGROUND OF THE INVENTION

1. Field of the Invention

The present invention concerns an arrangement for a discharge system for combustion gases and heated cooling air from an internal combustion engine-driven vehicle, in which the cooling-air and exhaust-gas discharge system has a gas outflow channel which opens in an open aperture in the vehicle's bodywork. The invention is specifically intended for application to military motor vehicles, such as tracked vehicles, tanks and similar, to give the vehicle's exhaust discharge system a low thermal signature, so-called IR signature, in order to protect against detection of the vehicle by heat-seeking cameras.

2. Description of Related Art

As disclosed in DE-A-3 221 378, the hot combustion gases from the engine in a known military vehicle are mixed with cooling air in a collecting chamber in the lower part of the vehicle before being released through a plurality of grated openings in the underside of the vehicle's bodywork. However, with a gas discharge arrangement of this kind, an increased IR signature is obtained since the exhaust gases warm up the underlying ground as well as the underside of the bodywork through contact with the gases.

U.S. Pat. No. 4,864,819 describes an exhaust gas outlet from a gas turbine-driven military vehicle where the outlet is provided with strong, inclined ballistic engine protection plates which can be cooled internally and externally with cooling air flowing through a small number of slots at, between or in these plates in order to reduce their temperature as sensed from the outside. No means for effective cooling of those parts of the outlet located directly adjacent to the aperture are disclosed; instead the exhaust gases can by turbulence mix with the peripheral cooling air and heat up the outlet aperture, and thus the vehicle is not given an optimally low IR signature.

U.S. Pat. Nos. 3,981,448, 3,921,906 and GB-1 128 532 disclose other arrangements to deflect the exhaust gases from jet engines and simultaneously to cool the deflecting surfaces down by bringing in external cooling air.

SUMMARY OF THE INVENTION

According to the present invention, a cooling arrangement is disclosed for an internal combustion engine-driven land vehicle, where not only the vehicle's engine but other heat-emitting sources and its exhaust outlet can be cooled effectively by means of a common fan unit and thereby improve the vehicle's IR signature, irrespective of whether the vehicle is moving or stationary.

For this objective the arrangement according to the invention as mentioned by way of introduction comprises a motor radiator mounted in the gas outflow channel; a silencer connected to the vehicle's internal combustion engine and opening into the gas outflow channel downstream of the motor radiator in such a way that the silencer outlet is not directly visible from outside through the gas outflow channel's discharge aperture, said gas outflow channel having, at least in an area of the same adjacent to the aperture, a boundary wall which is perforated right up to the open aperture and surrounded by a cooling air channel; and a motor-driven fan placed in a space upstream of the motor radiator for the purpose of generating forced cooling air streams partly through the radiator and partly through the cooling air channel via bypass openings, so that cooling air in the cooling air channel can sweep over the inner side as well as the outer side of the perforated wall in order to cool it and prevent direct contact between the exhaust gases and the perforated wall.

Additional characteristics of the arrangement according to the present invention are disclosed in closer detail below by reference to the appended drawing.

BRIEF DESCRIPTION OF THE DRAWING

The drawing shows schematically a cross section through the space in a vehicle situated directly above a (not shown) track set of a military tracked vehicle.

DESCRIPTION OF PREFERRED EMBODIMENT

The drawing shows a cross section through a track rack, generally denoted by 10, on a track-driven vehicle. This track rack is situated above its respective track set (not shown) on the vehicle and is made to be able to accommodate inter alia the driving equipment of the vehicle, the track rack 10 of the vehicle being designed to accommodate one or more internal combustion engines, such as diesel engines, cooling systems, batteries, fuel tanks, control equipment etc. The track rack 10 has an outer side wall 12, which can be armoured, a lower bottom wall 14, an inner side wall 16, which can also be armoured, and an upper wall 18. In the upper wall 18, a grated air intake 20 is installed, through which fresh air can be sucked vertically into a ventilation shaft 22 by means of a motor-driven fan 24. The fan 24 feeds cooling air though a radiator 26 to cool the coolant from a (not shown) internal combustion engine and/or from other power systems or equipment which need to be cooled. Downstream from the cooler 26, cooling air is mixed with hot combustion gases from the vehicle's engine, which flow into a gas outflow channel 28 from a silencer 30. The gas outflow channel 28, which can be an extension of the ventilation shaft 22, is bent in its downstream part towards the outer side wall 12 and opens in an open discharge aperture 32 in the wall. The gas outflow channel 28 is bounded by a wall 34 which has slots or is perforated, at least in that part of the wall which is situated downstream of the discharge aperture 36 of the silencer 30. The gas outflow channel 28 is also surrounded by a cooling air channel 38 connected to the pressure side of the fan 24 via openings 40, whereby a flow of cooling air sucked in from outside can be bypassed round cooler 26 and not only led over the outside of channel wall 34, but also directed over the inside of the wall via holes or slots in channel wall 34. By this means the channel wall 34, visible from the outside via opening 32, is kept well cooled in order to reduce the risk of detection by heat-seeking cameras. Similarly, the fact that the discharge aperture 32 is completely open, i.e. is not equipped with grids and similar, contributes to the vehicle's low IR signature, since there is no object to be warmed up by the discharged exhaust gases.

As shown on the drawing, the open gas outflow aperture 32 is preferably located on a side wall 12 of the vehicle's bodywork. However, location on an upper boundary wall is entirely possible. On the other hand, location on a lower bottom wall should be avoided for reasons previously mentioned. Preferably the cross section of the discharge aperture 32 is chosen to be relatively small so that the exhaust gases discharge velocity is correspondingly high so as thus to prevent heating up of side surfaces of the vehicle bodywork adjacent to the aperture. The latter effect is also contributed to by the fact that cool air from cooling air channel 38 also flows out round the perimeter of aperture 32 and forms a cool air-shield around the exhaust gas stream.

Further, it is advisable to coat the perforated channel wall 34 with a radar absorbing material to reduce the risk of detection by means of radar.

Location of the silencer 30 should be such that it is not directly visible from outside from the side, as indicated in the drawing. This is also to give the vehicle a low IR signature.

What is claimed is:

1. Arrangement for a discharge system for combustion gases and cooling air from an internal combustion engine-driven land vehicle, wherein the exhaust gas discharge system has a gas outflow channel which opens in an open aperture in the vehicle's bodywork, comprising a motor radiator mounted in the gas outflow channel; a silencer connected to the vehicle's internal combustion engine and opening into the gas outflow channel downstream of the motor radiator in such a way that the silencer outlet is not directly visible from outside through the gas outflow channel's discharge aperture, said gas outflow channel having, at least in an area of the same adjacent to the aperture, a boundary wall which is perforated right up to the open aperture and surrounded by a cooling air channel; and a motor-driven fan placed in a space upstream of the motor radiator for the purpose of generating forced cooling air streams partly through the radiator and partly through the cooling air channel via bypass openings, so that cooling air in the cooling air channel can sweep over the inner side as well as the outer side of the perforated wall in order to cool it and prevent direct contact between the exhaust gases and the perforated wall.

2. Arrangement according to claim 1, wherein the cross section of the discharge aperture is chosen so small, that the emerging exhaust gases have a relatively high flow rate in order to avoid heating up of side surfaces of the vehicle bodywork adjacent to the aperture.

* * * * *